United States Patent
Voutilainen

(10) Patent No.: US 6,524,171 B2
(45) Date of Patent: Feb. 25, 2003

(54) RECOVERY SYSTEM FOR BLASTING DEVICE

(75) Inventor: Tenho Voutilainen, Kera (FI)

(73) Assignee: Pekotek Oy, Tuusula (FI)

( * ) Notice: Subject to any disclaimer, the term of this patent is extended or adjusted under 35 U.S.C. 154(b) by 0 days.

(21) Appl. No.: 09/254,885

(22) PCT Filed: Sep. 15, 1997

(86) PCT No.: PCT/FI97/00546
§ 371 (c)(1),
(2), (4) Date: Jul. 9, 1999

(87) PCT Pub. No.: WO98/10894
PCT Pub. Date: Mar. 19, 1998

(65) Prior Publication Data
US 2001/0055943 A1 Dec. 27, 2001

(30) Foreign Application Priority Data
Sep. 16, 1996 (FI) .................................................. 963650

(51) Int. Cl.$^7$ .............................................. B24C 9/00
(52) U.S. Cl. ........................... 451/88; 451/451; 451/38; 451/99; 451/89
(58) Field of Search ..................... 451/87, 38, 88–89, 451/99–100; 251/227; 222/564; 92/130 D, 130 C, 130 R, 135; 454/49, 251; 209/243, 244, 246, 247, 21, 30, 31, 36, 37

(56) References Cited

U.S. PATENT DOCUMENTS

| | | | | |
|---|---|---|---|---|
| 2,912,918 A | * | 11/1959 | Mead | 55/378 |
| 3,640,023 A | * | 2/1972 | Field et al. | 451/88 |
| 3,672,292 A | | 6/1972 | Arnold | |
| 3,863,392 A | | 2/1975 | Haker | |
| 4,396,408 A | * | 8/1983 | Mace | 55/378 |
| 4,610,113 A | * | 9/1986 | Fagerroos | 451/88 |
| 5,231,804 A | * | 8/1993 | Abbott | 451/88 |
| 5,445,557 A | * | 8/1995 | Gramm et al. | 451/88 |

FOREIGN PATENT DOCUMENTS

FI 84891 B 10/1991

* cited by examiner

Primary Examiner—George Nguyen
(74) Attorney, Agent, or Firm—Greenberg Traurig, LLP; Joseph M. Manak

(57) ABSTRACT

The invention relates to an improved recovery system for blasting works, comprising a space below a perforated floor of the blasting works for receiving the blast material, and suction channels (21) for leading the blast material from the space below the floor to a classifier by using a blower; the recovery system comprises at least one elongated, substantially horizontal chute (17) opening upwards and arranged into the said space, the chute comprising two side walls (18, 19), and an elongated cover element (20) with two elongated free side edges (22, 23) arranged over the chute; the chute (17) and cover element (20) form between them a discharge channel (21) for the blast material; in addition, the system comprises pneumatic cylinders (26) for moving the cover element (20) in vertical direction between a lower and a raised position so that in the lower position, the side edges (22, 23) of the cover element engage the side walls (18, 19) of the chute and, in the raised position, the side edges (22, 23) of the cover element are at a distance from the side walls (18, 19) of the chute, thus forming two elongated suction gaps (24, 25) for leading the blast material to the discharge channel (21); further, the recovery system includes springs (27, 28) which cooperate with the pneumatic cylinders (26) for facilitating the movement of the cover element (20).

9 Claims, 3 Drawing Sheets

RECOVERY SYSTEM FOR BLASTING DEVICE

FIELD OF THE INVENTION

The present invention relates to a blasting works recovery system, comprising a space for receiving the blast material below a perforated floor of the blasting works, and suction ducts for directing the blast material from the space below the floor to a classifier with the help of a blower. The recovery system includes at least one elongated, substantially horizontal, chute opening upwards with two side walls fitted into the said space, and elongated cover element with two elongated free side edges arranged over the chute, the chute and the cover element forming between them a discharge channel for the blast material. The system comprises pneumatic cylinders for moving the cover element in vertical direction between a lower and a raised position so that in the lower position, the side edges of the cover element engage the side walls of the chute and, in the raised position, the side edges of the cover element are at a distance from the chute side walls, thus forming two elongated suction gaps for leading the blast material to the discharge channel.

BACKGROUND OF THE INVENTION

A recovery system for blasting works on the described type is known from the patent publication FI 84891. In this known solution, several, e.g. 30 pneumatic cylinders are needed to move the cover elements in blasting works of 20 meters long with five adjacent chutes. Additionally, the said patent publication proposes that only one cover element at a time is raised.

SUMMARY OF THE INVENTION

The object of the invention is to further improve the blasting works recovery system of the said patent publication, to avoid its drawbacks and to produce a reliable and cost-effective recovery system for blasting works.

These objects can be achieved by a blasting works recovery system in accordance with the present invention, the principal features of which will be evident from the enclosed claims.

It is thus characteristic of the blasting works recovery system of the present invention that it further comprises springs that cooperate with the pneumatic cylinders for facilitating the movement of the cover element. The solution of the invention makes it possible to substantially reduce the number of pneumatic cylinders required for the cover elements, which in its part reduces the costs of the blasting works recovery system.

The recovery system of the present invention advantageously comprises two or more parallel chutes opening upwards, and cover elements fitted over the chutes. The cover elements are advantageously arranged to move simultaneously with the help of the pneumatic cylinders and springs.

The one end of the springs is attached to the cover element and the other end to a fixed structure above the cover element, for example to a protective plate protecting the pneumatic cylinders. The springs may be attached in pairs to both sides of each pneumatic cylinder. The said springs are preferably spiral springs.

According to an advantageous embodiment, a filter is placed between the classifier and blower for filtering dusty air coming from the classifier. A suction chute of the before mentioned type, but shorter, may be arranged below the said filter, along which the waste material is transferred from the filter to a cyclone in which the waste material is separated, and clean air is directed to the blower.

In accordance with the invention, only one blower is required for the handling of the blast material, ventilation in the blast chamber, removal of dust and transfer of waste in the blasting works.

The recovery system of the invention may also comprise separate classifiers for different blast materials, such as sand and steel. This may be realized by equipping the suction ducts with a distribution branch with one branch leading to the first classifier and another to the second classifier.

The recovery system of the present invention makes it possible to construct the blasting works as one or several units which may be moved from one place to another and, for example, to use them when repairing structures under bridges.

The present invention is next described in more detail referring to the enclosed drawings, in which:

DETAILED DESCRIPTION OF THE PREFERRED EMBODIMENTS OF THE INVENTION

Figure 1:
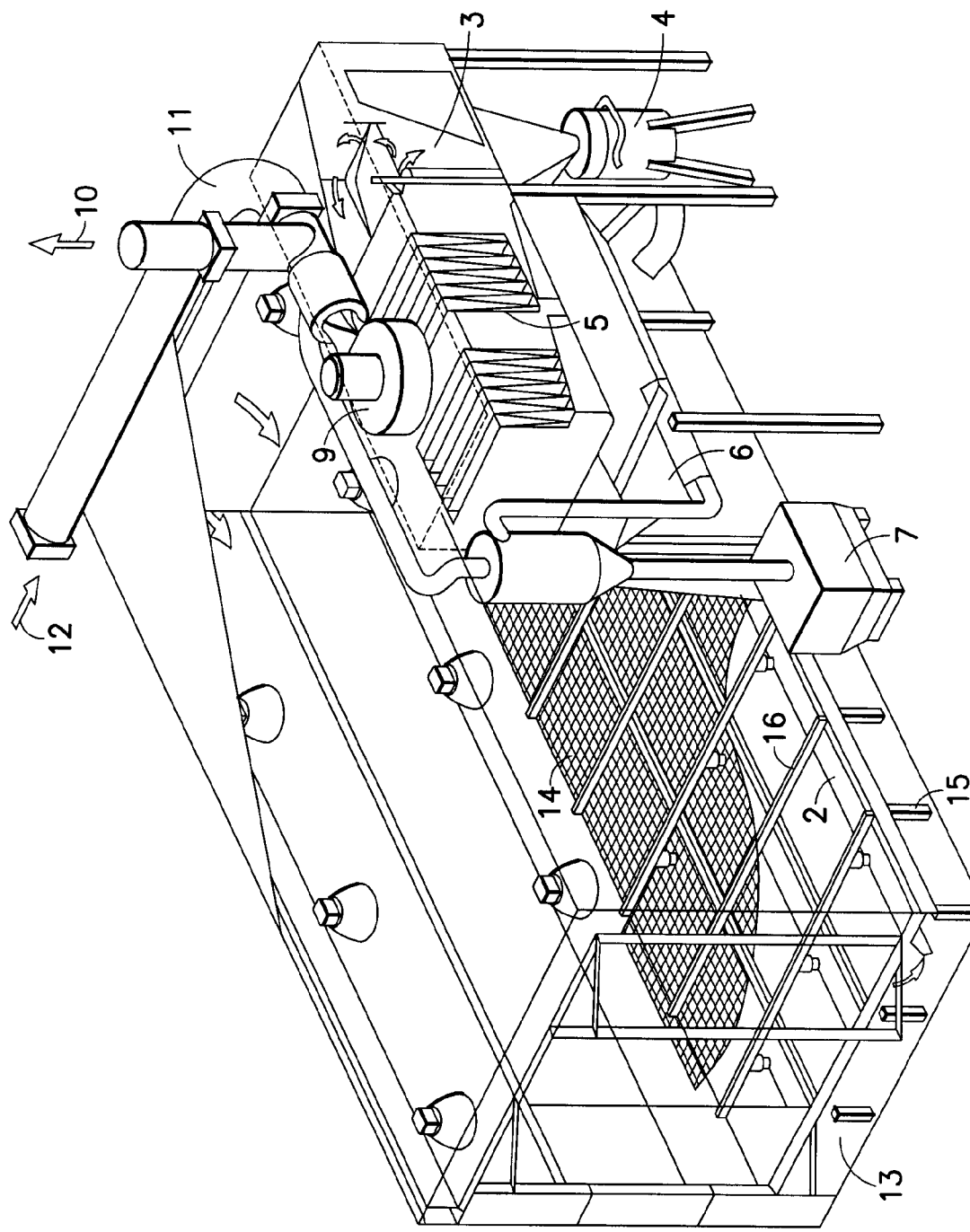
FIG. 1 is a schematic perspective view of a blasting works recovery system of the invention.
Figure 2:
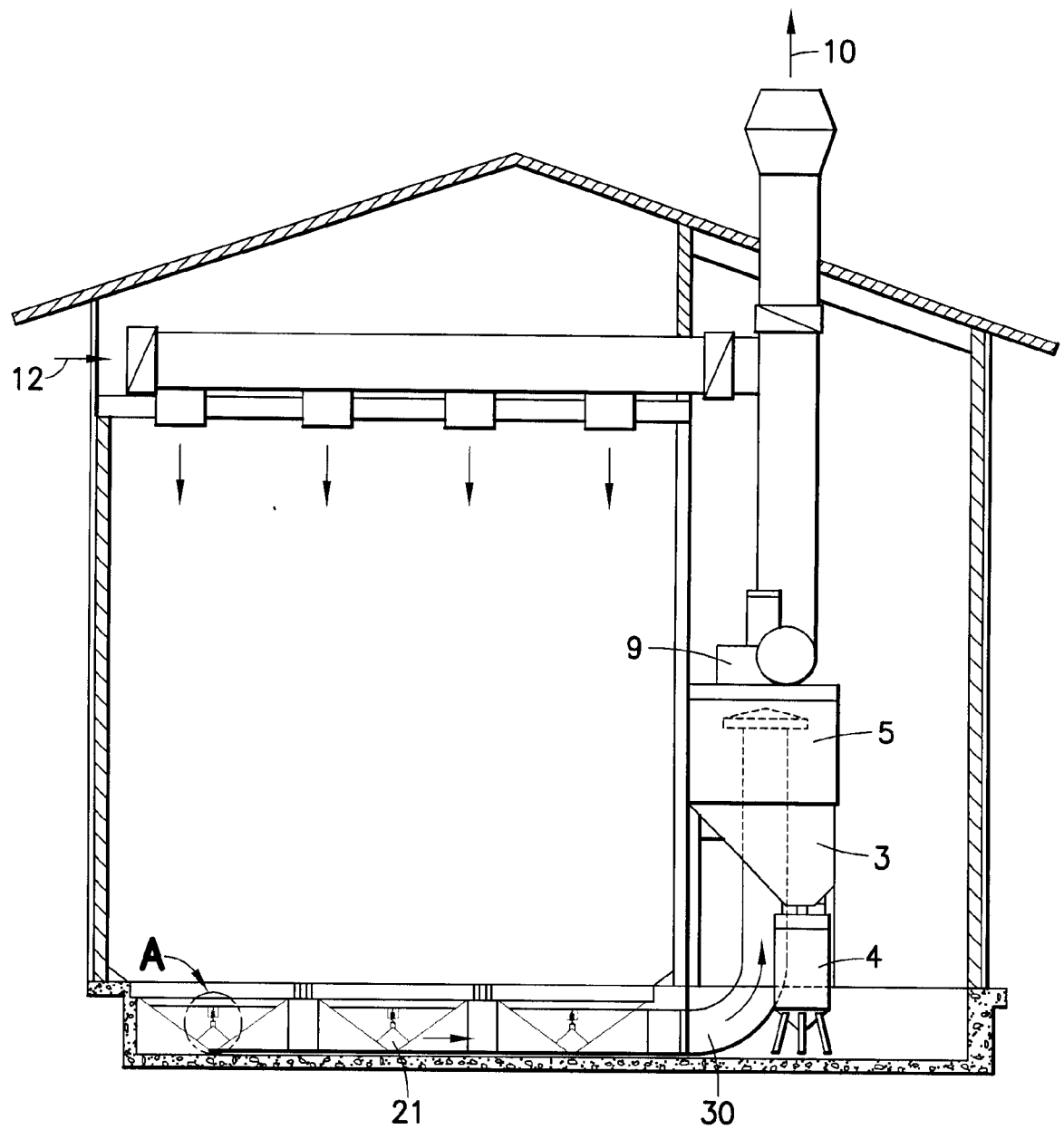
FIG. 2 is a cross-section of the recovery system in FIG. 1.

Referring to FIGS. 1–5, tin chutes 17 folded in V shape are arranged onto support legs 15 (or support beams) in a space 13 below the floor grate 14 of the blast chamber. A tin chute 20 with a cross-section of an inverted V is placed on each chute 17. These two chutes 17 and 20 form a suction chute structure 2. The floor grate 14 is placed on transverse beams 16. In the exemplary case described in the figures, the recovery system comprises three parallel chute structures.

Figure 3:
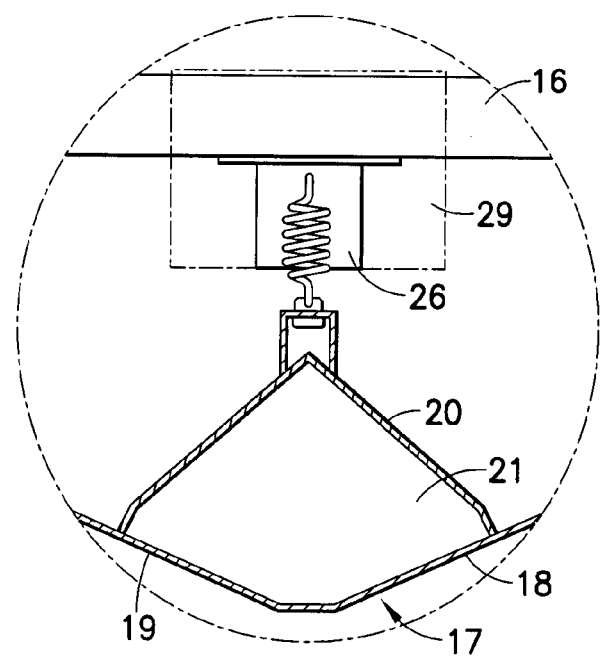
FIG. 3 shows a detail A of FIG. 2 in an enlarged scale.
Figure 4:
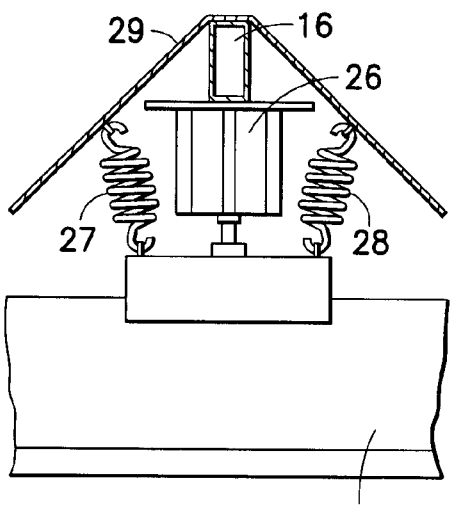
FIG. 4 shows the same structure as FIG. 3, but seen from the side.
Figure 5:
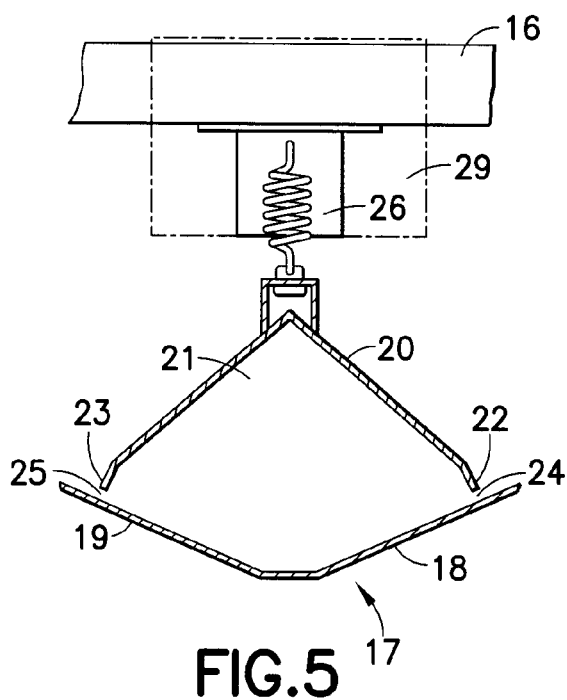
FIG. 5 shows the same structure as FIG. 3, but in another operational position.

Referring to FIGS. 3 and 5, the chutes 17 have side walls 18 and 19. The chute 20 arranged on the chute 17 includes free side edges 22 and 23 (see FIG. 5). The chutes 17 and 20 form between them a discharge channel 21 for the blast material. The chutes 20 may be moved in vertical direction by pneumatic cylinders 26. The operation of the pneumatic cylinders 26 may be controlled by magnetic valves (not shown). Spiral springs 27 and 28 are arranged on both sides of the pneumatic cylinders 26. The one end of the spiral springs 27 and 28 is attached to a fastening element located in the upper part of the chute 20, and the other end to a protective hood 29 protecting the cylinders 26. The protective hood 29 is arranged over the support beam 16 of the floor grate 14. The said spiral springs 27 and 28 facilitate the raising of the chute 20 to its upper position with the help of pneumatic cylinders 26.

When the chute 20 is raised with the help of pneumatic cylinders 26 and spiral springs 27 and 28, suction gaps 24 and 25 (FIG. 5) are generated between the chutes 17 and 20. As is apparent from FIG. 5, one suction gap 24 is generated between the side wall 18 of the chute 17 and the free side edge 22 of the chute 20 and, respectively, a second suction gap 25 is generated between the side wall 19 of the chute 17 and the side edge 23 of the chute 20. The blast material drops partly by itself through the floor grate 14 on the chutes 17 and 20, and partly, the blast material is sucked up through the floor grate to the space 13 below the floor grate by the blower 9. When the chute 20 is raised by using the pneumatic cylinders 26 and the spiral springs 27 and 28, the blast material is led to the discharge channel 21 through the suction gaps 24 and 25. The one end of the discharge channel 21 is connected to a connecting channel 30 (FIG. 2) along which the blast material is led to the classifier 3, in which the blast material to be reused is separated. The other end of the discharge channel 21 is equipped with air inlets. Dust and air are led from the classifier 3 to the filter 5, in which dust is separated. Cleaned air may be returned to the blasting works.

The recovery system for blasting works operates in the following way:

Handling of the blast material in the blasting works, ventilation of the blast chamber, discharge of dust and transfer of waste are carried out by one blower 9, which may be of a centrifugal type and in which the impeller is placed directly on the motor axle. Air 1 is sucked by the blower 9 through the suction chutes 2 and, at the same time, air flow leads the used blast material accumulating in the suction chutes to the connecting channel 30 and further to the classifier 3, from which the usable blast material is returned to the blasting tank 4. Dusty air is further led to the filter 5 which filters the air. The filter 5 may include an automatic impulse cleaning dropping the waste to the bottom 6 of the filter, which may include a suction chute structure of the type described above. From the bottom 6 of the filter 5 the waste is either led directly to the waste container 7, or it is led with the help of air flow to the cyclone 8, from which it is led to the waste container 7. Clean air is led to the blower 9, from which it is either totally blown outside 10 (summer), or 80% of it are returned 11 to the blasting chamber (winter). Replacement air 12 is taken to the blasting chamber either from outside or from the surrounding hall.

Above there has been described only one embodiment of the invention, and it is obvious that modifications are possible within the scope of the patent claims.

What is claimed is:

1. A blasting works recovery system, which comprises
   a perforated floor, which defines a space below the perforated floor for receiving blast material, and
   at least one elongated, substantially horizontal, upwards opening chute, having two side walls, arranged in the space, each chute having an elongated cover element having two elongated free side edges positioned over the chute;
   the chute and the cover element defining between them a discharge channel for the blast material, wherein the discharge channel is in fluid communication with a classifier and a blower for transporting blast material from the space below the floor to the classifier;
   the system further comprising a plurality of pneumatic cylinders and a plurality of spiral springs, wherein a combination of two spiral springs arranged on both sides of each pneumatic cylinder is configured and adapted to act cooperatively, such that, upon movement of the pneumatic cylinders they provide a force in an upwards direction to facilitate movement of the elongated cover element vertically between a lower position and a raised position, the spiral springs provide a force in an upwards direction corresponding to that of the vertical force provided by the pneumatic cylinders, thereby moving the elongated cover element vertically together with the pneumatic cylinders,
   wherein, in the lower position, the side edges of the cover element engage the side walls of the chute and, in the raised position, the side edges of the cover element are at a distance from the side walls of the chute, thereby forming elongated suction gaps between the side walls of the at least one chute and the side edges of the cover element for leading the blast material to the discharge channel.

2. The recovery system of claim 1, comprising more than one upwards opening chute, each chute having a cover element positioned over the chute; the pneumatic cylinders and springs configured and adapted to simultaneously move all the cover elements vertically.

3. The recovery system of claim 1, wherein each spring has a first end and a second end, and the first end of each spring is attached to the cover element and the second end is attached to a protective plate protecting the pneumatic cylinders.

4. The recovery system of claim 3, wherein the springs are attached in pairs on opposite sides of each pneumatic cylinder.

5. The recovery system of claim 1, wherein the springs are spiral springs.

6. The recovery system of claim 1, further comprising a filter positioned between the classifier and the blower for filtering dust in air from the classifier.

7. The recovery system of claim 6, wherein below the filter there is a substantially horizontal chute opening upwards, which has two side walls; over the chute there is a cover element with two free side edges, the chute and the cover element forming between them a discharge tunnel for the waste material coming from the filter, the cover element being moved by pneumatic cylinders in vertical direction between a lower and a raised position; in the lower position, the side edges of the cover element engage the side walls of the chute and, in the raised position, the side edges of the cover element are at a distance from the side walls of the chute, thus forming two elongated gaps for leading the waste material to the discharge channel.

8. The recovery system of claim 7, wherein a cyclone is arranged between the filter and blower, to which the waste material is fed from the discharge channel and in which the waste material is separated from air going to the blower.

9. The recovery system of claim 1, further comprising classifiers for different blast materials.

* * * * *